(12) United States Patent
King (10) Patent No.: US 8,120,290 B2
(45) Date of Patent: Feb. 21, 2012

(54) ENERGY MANAGEMENT SYSTEM TO IMPROVE EFFICIENCY OF ELECTRIC AND HYBRID DRIVE TRAINS

(75) Inventor: Robert Dean King, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 585 days.

(21) Appl. No.: 12/250,182

(22) Filed: Oct. 13, 2008

(65) Prior Publication Data

US 2010/0090626 A1 Apr. 15, 2010

(51) Int. Cl.
*H02P 1/00* (2006.01)
*H02P 3/00* (2006.01)

(52) U.S. Cl. ....... 318/139; 318/440; 318/442; 180/65.1; 180/65.2

(58) Field of Classification Search .................. 318/139, 318/430, 437, 109, 440, 442; 180/65.1, 65.3
See application file for complete search history.

(56) References Cited

U.S. PATENT DOCUMENTS

| | | | |
|---|---|---|---|
| 5,373,195 A | 12/1994 | De Doncker et al. | |
| 5,710,699 A | 1/1998 | King et al. | |
| 5,903,449 A | 5/1999 | Garrigan et al. | |
| 7,049,792 B2 | 5/2006 | King | |
| 7,568,537 B2 * | 8/2009 | King | 180/65.1 |
| 7,595,597 B2 * | 9/2009 | King et al. | 318/139 |
| 2004/0189226 A1 | 9/2004 | King | |
| 2005/0284676 A1 * | 12/2005 | King et al. | 180/65.3 |
| 2007/0158118 A1 * | 7/2007 | King | 180/65.1 |
| 2007/0164693 A1 * | 7/2007 | King et al. | 318/109 |
| 2009/0033254 A1 * | 2/2009 | Nagashima et al. | 318/139 |

FOREIGN PATENT DOCUMENTS

WO 2007081875 A2 7/2007

OTHER PUBLICATIONS

Ortuzar et al, "Design, Construction and Performance of a Buck-Boost Converter for an Ultracapacitor-Based Auxiliary Energy System for Electric Vehicles," IEEE, 2003, pp. 2889-2894.
Miller et al., "Ultracapacitor Plus Battery Energy Storage System Sizing Methodology for HEV Power Split Electronic CVT's," IEEE, 2005, pp. 317-324.
Liu et al., "A ZVS Bi-Directional DC-DC Converter for Multiple Energy Storage Elements," IEEE, 2006, pp. 1513-1517.
Rosario et al., "Implementation of a Modular Power and Energy Management Structure for Battery—Ultracapacitor Powered Electric Vehicles," pp. 141-156.

* cited by examiner

*Primary Examiner* — Paul Ip
(74) *Attorney, Agent, or Firm* — Joseph J. Christian (57) ABSTRACT

A propulsion system is provided that includes an electric drive, a first energy storage system electrically coupled to the electric drive through a direct current (DC) link, and a second energy storage system electrically coupled to the electric drive. The propulsion system further includes a multi-channel bi-directional boost converter coupled to the first energy storage system and to the second energy storage system such that the second energy storage system is decouplable from the DC link, wherein the second energy storage system comprises at least one battery coupled in series with at least one ultracapacitor.

21 Claims, 7 Drawing Sheets

ENERGY MANAGEMENT SYSTEM TO IMPROVE EFFICIENCY OF ELECTRIC AND HYBRID DRIVE TRAINS

BACKGROUND

1. Technical Field

The invention relates generally to vehicle drive systems, and more specifically to battery powered drive systems such as are used in battery powered electric vehicles or hybrid vehicles.

2. Discussion of Art

Recently, electric vehicles and hybrid electric vehicles have become increasingly popular. These vehicles are typically powered by one or more batteries, either alone or in combination with an internal combustion engine. In electric vehicles, the one or more batteries power the entire drive system, thereby eliminating the need for an internal combustion engine. Hybrid electric vehicles, on the other hand, include a small internal combustion engine to supplement the battery power, which greatly increases the fuel efficiency of the vehicle.

Traditionally, the electric and hybrid electric propulsion systems in these vehicles required the use of large batteries, ultracapacitors, flywheels, or a combination of these elements so as to provide sufficient energy to power the electric motor. While generally effective, the size and weight of the elements reduced the overall efficiency of the propulsion system and presented challenges for integration into the vehicles themselves.

Another challenge related to conventional electric propulsion systems was that the nominal voltage of the energy storage units (i.e., batteries and/or ultracapacitors) set the overall system voltage. Thus, the energy available to power the electric motor was limited to the energy available in the energy storage units themselves. Such a configuration limited the overall reliability and efficiency of the electric propulsion system, as the voltage demands of the electric motor were often far greater than the energy storage unit voltage. To combat this issue, several alternative electric propulsion system configurations have been devised. In particular, U.S. Pat. No. 5,373,195 shows the use of a bi-directional boost converter to decouple the energy storage unit voltage from a direct current (DC) link voltage, wherein the DC link is coupled to the electric motor. The bi-directional boost converter acts to increase, or "boost", the voltage provided from the energy storage unit to the DC link to meet the power demands of the electric motor. In fact, the ratio of the DC link voltage to the energy storage unit voltage is typically greater than two-to-one. The bi-directional boost converter enables such an increase in voltage supplied to the DC link without the need for an increase in the size of the energy storage unit or units.

While the bi-directional boost converter successfully allows for an increased supply of voltage to the DC link without a corresponding increase in size of the energy storage unit(s), the efficiency of the bi-directional boost converter degrades during certain operating modes. In particular, during high-speed and high-power acceleration and deceleration of the vehicle, the ratio of DC link voltage to battery voltage is often greater than 2.5:1. Under these operating modes, the level of electrical current to which the components of the boost converter are subjected is very high, and therefore there is a subsequent need for proper thermal design to dissipate heat in the power electronic components of the boost converter. This thermal cycling stress on the components of the bi-directional boost converter poses a potential reliability issue, as well as a reduction in overall system efficiency.

Furthermore, during high-speed and high-power deceleration, a concept known as "regenerative braking" enables power at potentially relatively high voltage generated by the electric motor to be cycled back through the bi-directional boost converter for storage in the energy storage unit(s). However, at high DC link voltage to battery voltage ratios, there are again high losses within the bi-directional boost converter that require proper heat dissipation in the electrical components. Also, the regeneration power provided to the energy storage unit is often limited by the charge acceptance of the energy storage unit itself, which further reduces the efficiency of the system.

Therefore, it is desirable to provide an electric and/or hybrid electric propulsion system having greater overall system efficiency along with an increased level of energy capture during high-power regenerative braking.

BRIEF DESCRIPTION OF THE INVENTION

In accordance with one aspect of the invention, a propulsion system is shown comprising an electric drive, a first energy storage system electrically coupled to the electric drive through a direct current (DC) link and a second energy storage system electrically coupled to the electric drive. The propulsion system further comprises a multi-channel bi-directional boost converter coupled to the first energy storage system and to the second energy storage system such that the second energy storage system is decouplable from the DC link, wherein the second energy storage system comprises at least one battery coupled in series with at least one ultracapacitor.

In accordance with another aspect of the invention, a method of assembling a control system is shown, the method comprising coupling a first energy storage system to an electric drive through a direct current (DC) link and connecting an ultracapacitor in series with a battery to form a second energy storage system. The method further comprises coupling a multi-channel bi-directional boost converter to each of the first energy storage system and second energy storage system such that the first energy storage system is decoupled from the second energy storage system, wherein the multi-channel bi-directional boost converter is further coupled to the electric drive through the DC link.

In accordance with another aspect of the invention, an energy storage arrangement for an electrically powered system is shown, the arrangement comprising at least one ultracapacitor coupled in series with at least one battery and a multi-channel bi-directional boost converter coupled to the at least one ultracapacitor and the at least one battery, wherein the multi-channel bi-directional boost converter is configured to dynamically control an input and an output voltage from the at least one ultracapacitor and the at least one battery.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention include an electric drive, a first energy storage system electrically coupled to the electric drive through a direct current (DC) link, a second energy storage system electrically connected to the electric drive such that the voltage output from the second energy storage system is decoupled from the DC link using a multi-channel bi-directional boost converter, wherein the second energy storage system comprises an ultracapacitor coupled in series with a battery.

According to one embodiment of the invention, a propulsion system comprises an electric drive, a first energy storage system electrically coupled to the electric drive through a direct current (DC) link and a second energy storage system electrically coupled to the electric drive. The propulsion system further comprises a multi-channel bi-directional boost converter coupled to the first energy storage system and to the second energy storage system such that the second energy storage system is decouplable from the DC link, wherein the second energy storage system comprises at least one battery coupled in series with at least one ultracapacitor.

According to one embodiment of the invention, a method of assembling a control system comprises coupling a first energy storage system to an electric drive through a direct current (DC) link and connecting an ultracapacitor in series with a battery to form a second energy storage system. The method further comprises coupling a multi-channel bi-directional boost converter to each of the first energy storage system and second energy storage system such that the first energy storage system is decoupled from the second energy storage system, wherein the multi-channel bi-directional boost converter is further coupled to the electric drive through the DC link.

According to one embodiment of the invention, an energy storage arrangement for an electrically powered system comprises at least one ultracapacitor coupled in series with at least one battery and a multi-channel bi-directional boost converter coupled to the at least one ultracapacitor and the at least one battery, wherein the multi-channel bi-directional boost converter is configured to dynamically control an input and an output voltage from the at least one ultracapacitor and the at least one battery.

Figure 1:
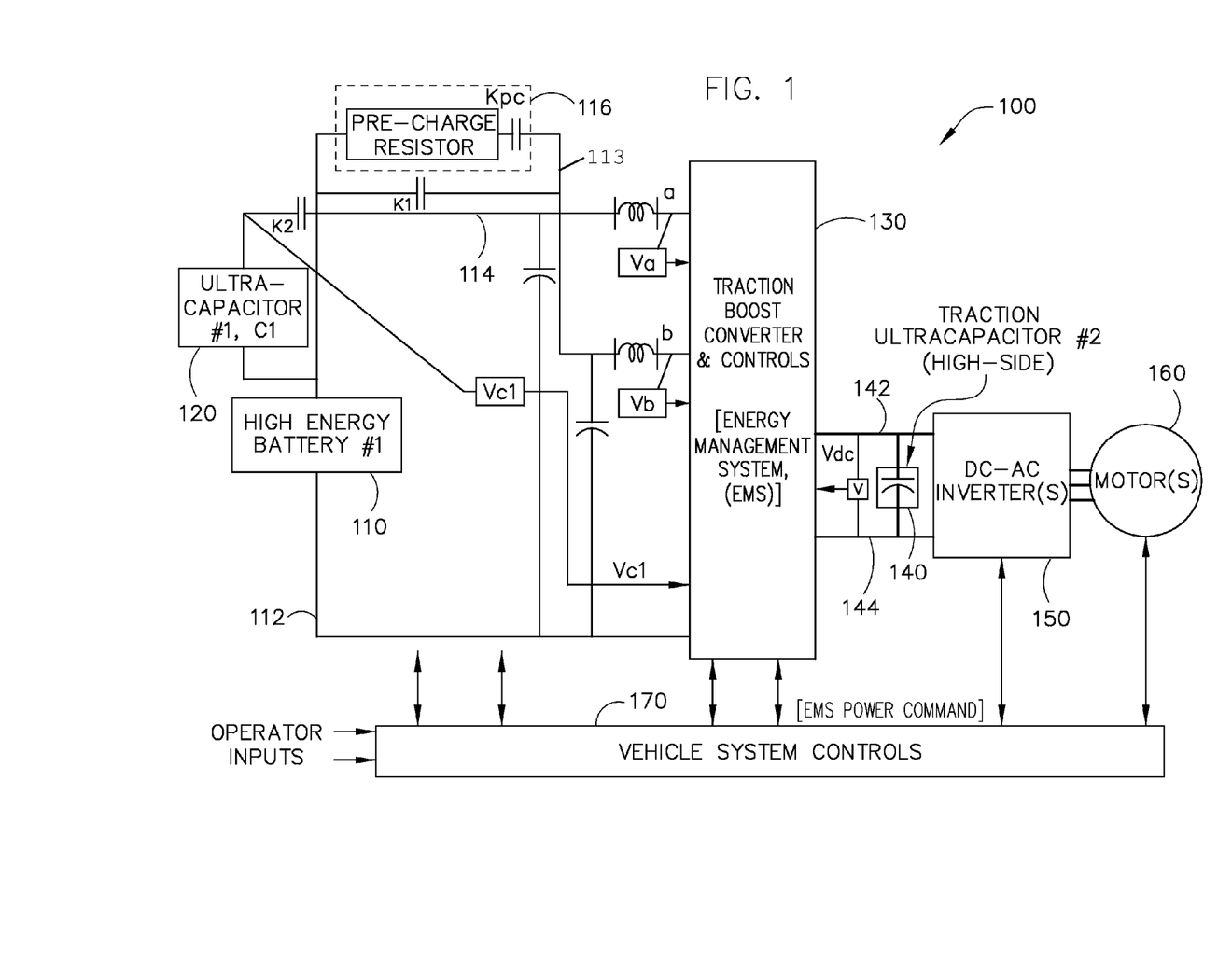
FIG. 1 schematically illustrates an exemplary propulsion system.

FIG. 1 illustrates a vehicle propulsion system 100 according to one exemplary embodiment. Vehicle propulsion system 100 includes, in part, an energy battery 110, an ultracapacitor 120, and a multi-channel bi-directional boost converter 130. The ultracapacitor 120, as used herein, represents a capacitor comprised of multiple capacitor cells connected in a series arrangement, where the capacitor cells each have a capacitance that is greater than 500 Farads. The term energy battery used herein describes a high specific energy battery or high energy density battery demonstrated to achieve an energy density on the order of 100 W-hr/kg or greater (e.g., a Li-ion, sodium-metal halide, sodium nickel chloride, sodium-sulfur, or zinc-air battery). Energy battery 110 and ultracapacitor 120 are coupled in series on the low voltage side of multi-channel bi-directional boost converter 130, wherein the negative terminal of energy battery 110 is coupled to a bus 112, also referred to as a negative DC link, while the positive terminal of electrically series connected energy battery 110 and ultracapacitor 120 are coupled to a bus 114, which is one of the positive DC links on the low-side of the multi-channel bi-directional boost converter 130. In addition, a pre-charge circuit 116 may be linked from energy battery 110 to a second positive DC link 113 also on the low voltage side of the multi-channel bi-directional boost converter 130. Busses 112, 113, and 114 are further coupled to the multi-channel bi-directional boost converter 130.

System 100 further includes a second ultracapacitor 140 on the high voltage side of multi-channel bi-directional boost converter 130, along with DC-AC inverter 150 and AC motor 160. The AC traction drive, shown in FIG. 1 as DC-AC inverter 150 and AC motor 160, could alternatively be replaced by a DC traction drive (not shown) by replacing inverter 150 with a DC chopper and AC motor 160 with a DC motor. Ultracapacitor 140 is coupled in parallel with the multi-channel bi-directional boost converter 130 via a positive DC link 142 and a negative DC link 144. DC-AC inverter 150 is also coupled to positive DC link 142 and negative DC link 144, through which DC-AC inverter 150 receives a DC voltage and then supplies an alternating current to AC motor 160. System 100 also includes a Vehicle Systems Control (VSC) 170 configured to operate system 100 in various modes that will be discussed later herein.

In operation, the multi-channel bi-directional boost converter 130 acts to boost the voltage provided by the low voltage side of system 100 to the high voltage side of system 100. While high voltage side ultracapacitor 140 is capable of providing sufficient energy to power the AC motor 160 such that the vehicle may be operated and accelerated at a relatively slow speed, if system 100 receives a command from the operator via VSC 170 that an increase in positive torque and thus an increase in vehicle speed is desired, the power provided to the AC motor 160 may need to be supplemented. In this instance, energy from energy battery 110 and/or ultracapacitor 120 on the low voltage side of multi-channel bi-directional boost converter 130 is utilized to provide the voltage necessary for increased acceleration of the vehicle. In the event ultracapacitor 120 is at a relatively low state of charge, or low voltage, the energy battery 110 voltage can be boosted to the high side DC links 142 and 144 via low side (channel "b") of multi-channel bi-directional boost converter 130 through positive DC link 113. The voltage provided by energy battery 110 and/or ultracapacitor 120 through positive DC link 113 and 114 is "boosted," or increased, via the multi-channel bi-directional boost converter 130 by a boost ratio typically greater than 2:1. In this way, the power needed to accelerate the vehicle is provided to AC motor 160 via DC links 142 and 144.

Under previous configurations, the efficiency of the multi-channel bi-directional boost converter degraded with high acceleration or deceleration of the vehicle. That is, as there was an increase in the ratio of voltage required to sufficiently power the AC motor versus voltage available on the low voltage side of bi-directional boost converter, the multi-channel bi-directional boost converter experienced increased electrical loss leading to thermal cycling stresses due to an increase in electrical current through components of the bi-directional boost converter. These increased currents lowered the efficiency of the bi-directional boost converter, which required proper thermal design and hardware to dissipate the heat from these losses in the power electronic components.

However, the exemplary embodiment shown in FIG. 1 addresses these issues to greatly improve the efficiency of system 100. Specifically, energy battery 110 and ultracapacitor 120 are coupled in series on the low voltage side of bi-directional boost converter 130 such that during normal operation of the system 100, a portion of the power provided to the multi-channel bi-directional boost converter 130 originates from ultracapacitor 120, which is able to capture and store a portion of the energy during vehicle deceleration events, known as regenerative braking, via the multi-channel bi-directional boost converter 130. During regenerative braking, ultracapacitor 120 voltage increases and therefore the sum of the ultracapacitor 120 and energy battery 110 voltage allows a higher level of voltage at DC Link 114 as compared to a conventional propulsion system having only an energy battery. During the next vehicle acceleration, the higher voltage provided by ultracapacitor 120 in series with energy battery 110 input at DC bus 114 to multi-channel bi-directional boost converter 130 reduces the level of electrical current flowing through the power electronic components of bi-directional boost converter 130. This reduced electrical current lowers the electrical loss and thermal cycling stresses imparted upon the electrical components, thereby increasing the overall efficiency of the multi-channel bi-directional boost converter 130. As the electrical loss in the multi-channel bi-directional boost converter 130 is lessened due to the reduced current level, the necessity for a heavy and expensive cooling system in bi-directional boost converter 130 is also reduced. Thus, the overall size, weight, and complexity of the bi-directional boost converter 130 can be reduced using the configuration set forth in FIG. 1.

Another benefit to the series configuration of energy battery 110 and ultracapacitor 120 is the ability to reduce the nominal voltage of energy battery 110, which in turn enables energy battery 110 to be smaller and lighter in weight than some conventional energy batteries. As ultracapacitor 120 is operable to provide a high voltage output to the multi-channel bi-directional boost converter 130 via bus 114, energy battery 110 does not, on its own, need to supply a high voltage output to the bi-directional boost controller 130. Rather, energy battery 110 may provide energy to ultracapacitor 120 in the event that the energy available in ultracapacitor 120 is depleted. Further, energy battery 110 and ultracapacitor 120 may both provide voltage outputs to bi-directional boost controller 130 in the event of a high-acceleration command being received from VSC 170. Also, with this series configuration, the energy battery 110 is capable of maintaining a high state-of-charge (SOC), which improves the efficiency and lifetime of the energy battery 110.

When a command to decelerate the vehicle is received by VSC 170, system 100 enters a regenerative braking mode. That is, during rapid deceleration of the vehicle, AC motor 160 generates energy that is then transferred back into the energy storage devices of system 100, namely ultracapacitor 140, ultracapacitor 120, and energy battery 110. The high voltage generated by regenerative braking is transferred through bi-directional boost converter 130 to the ultracapacitor 120 and/or energy battery 110. Conventionally, in a system with only an energy battery coupled through a bi-directional boost converter, a significant portion of the regenerative energy would have to be captured in the energy battery through increased current. Thus, high losses would be experienced both in the high energy battery's internal resistance and also in the bi-directional boost converter due to a limit in the amount of charge acceptance and voltage limits of the energy storage units. However, under the exemplary configuration, the losses in both the multi-channel bi-directional boost converter 130 and energy battery 110 are greatly reduced. That is, the series configuration of ultracapacitor 120 and energy battery 110 enables much of the regenerated energy to be captured in ultracapacitor 120, rather than relying upon only energy battery 110 to capture regenerated energy. Unlike energy battery 110, ultracapacitor 120 is operable at a low state-of-charge (SOC) and is capable of rapid electrical charge acceptance. As such, ultracapacitor 120 is capable of accepting much of the regenerative power from the high voltage regenerated energy generated by AC motor 160 during vehicle deceleration, resulting in lower electrical loss and thermal cycling stresses within multi-channel bi-directional boost converter 130 and energy battery 110, thereby improving the overall efficiency of system 100.

Yet another advantage to the exemplary embodiment of FIG. 1 is the ability to dynamically control the energy levels provided to and from the energy storage devices. Multi-channel bi-directional boost converter 130 is operable to adaptively control these energy levels based on vehicle speed, state-of-charge of the ultracapacitor, state-of-charge of the energy battery, AC traction drive torque demand and AC traction drive speed. For example, such dynamic control enables multi-channel bi-directional boost converter 130 to independently control the amount of energy supplied by ultracapacitor 120 and/or energy battery 110 during vehicle acceleration. That is, after a high acceleration command is received from VSC 170, multi-channel bi-directional boost converter 130 operates to control the amount of power provided from ultracapacitor 120 and, if need be, energy battery 110, to adequately power AC motor 160. Likewise, during vehicle deceleration, bi-directional boost converter operates to control the amount of regenerated power and energy provided to ultracapacitor 120 and/or energy battery 110 to maximize the overall charge acceptance of the system. Such dynamic control greatly improves the overall efficiency of system 100.

Figure 2:
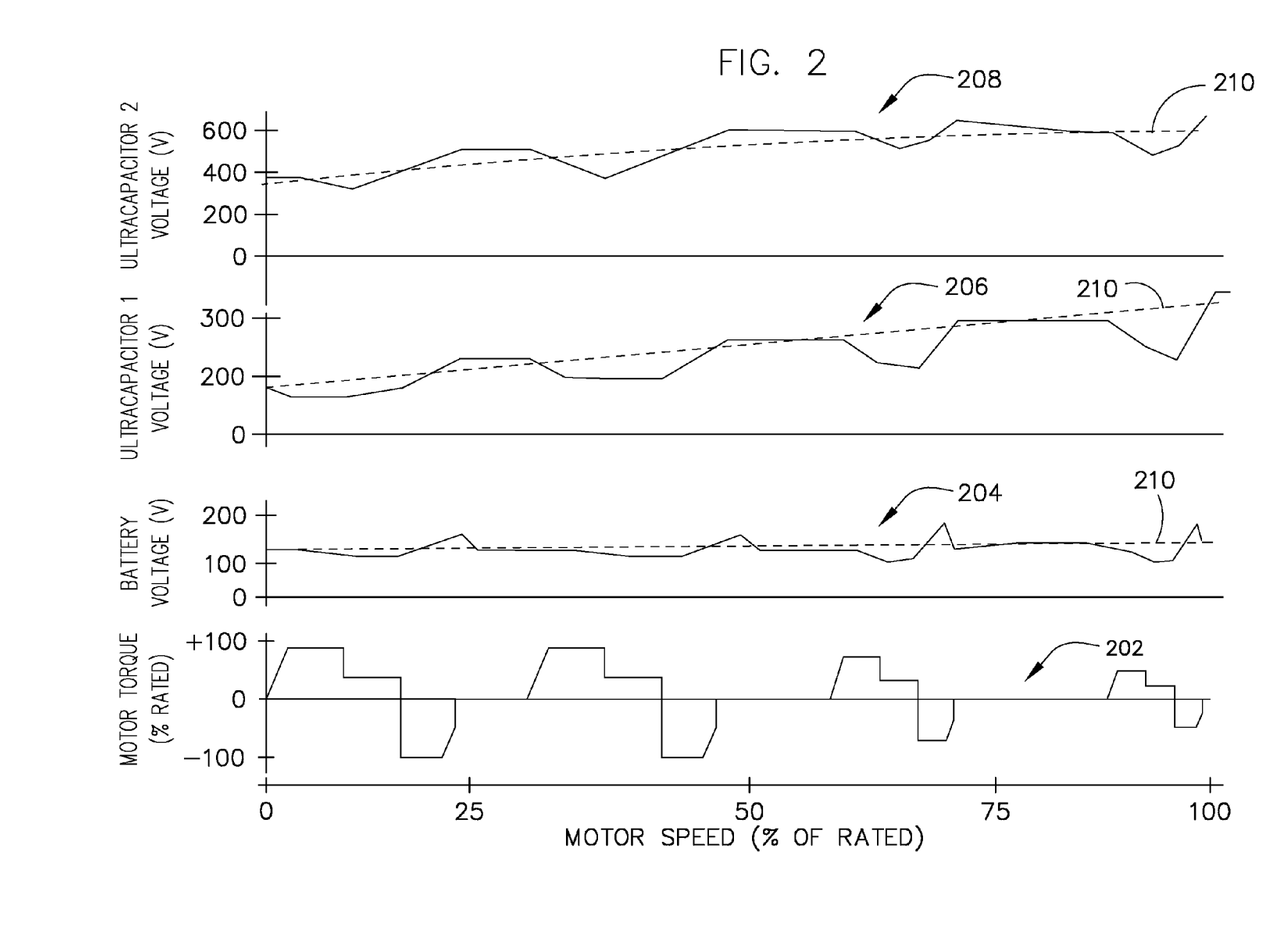
FIG. 2 is a graphical illustration of the system shown in the exemplary propulsion system during operation.

Referring now to FIG. 2, a graphical representation of system 100 illustrates normal operation of system 100 wherein the DC Link voltage is shown as a function of the motor speed and torque. The dotted lines 210 represent the exemplary reference values for the associated energy storage component voltages. As shown in graph 202, the full torque of the drive, for an exemplary AC motor design, is achievable by ramping the reference voltage from some predetermined minimum value to a predetermined maximum reference value at a motor speed of approximately 50% of rated speed. From 50% to 100% rated motor speed, the reference DC Link voltage is held substantially constant. As shown in graph 208, ultracapacitor 140 voltage (referenced as Ultracapacitor 2) fluctuates above and below the reference line as energy is being extracted from or supplied to the device. As the ultracapacitor 140 voltage, i.e., state-of-charge, approaches the limit, additional energy is provided to the device, primarily from ultracapacitor 120 (referenced as Ultracapacitor 1), as is illustrated in graph 206. When ultracapacitor 120 is unable to provide the desired energy, the energy battery 110 is utilized to provide additional energy, as shown in graph 204. For example, during operation while climbing steep grades over extended time period, the energy battery 110 is operable to provide much of the energy, since the energy stored in both ultracapacitor 140 and ultracapacitor 120 may be substantially depleted.

Figure 3:
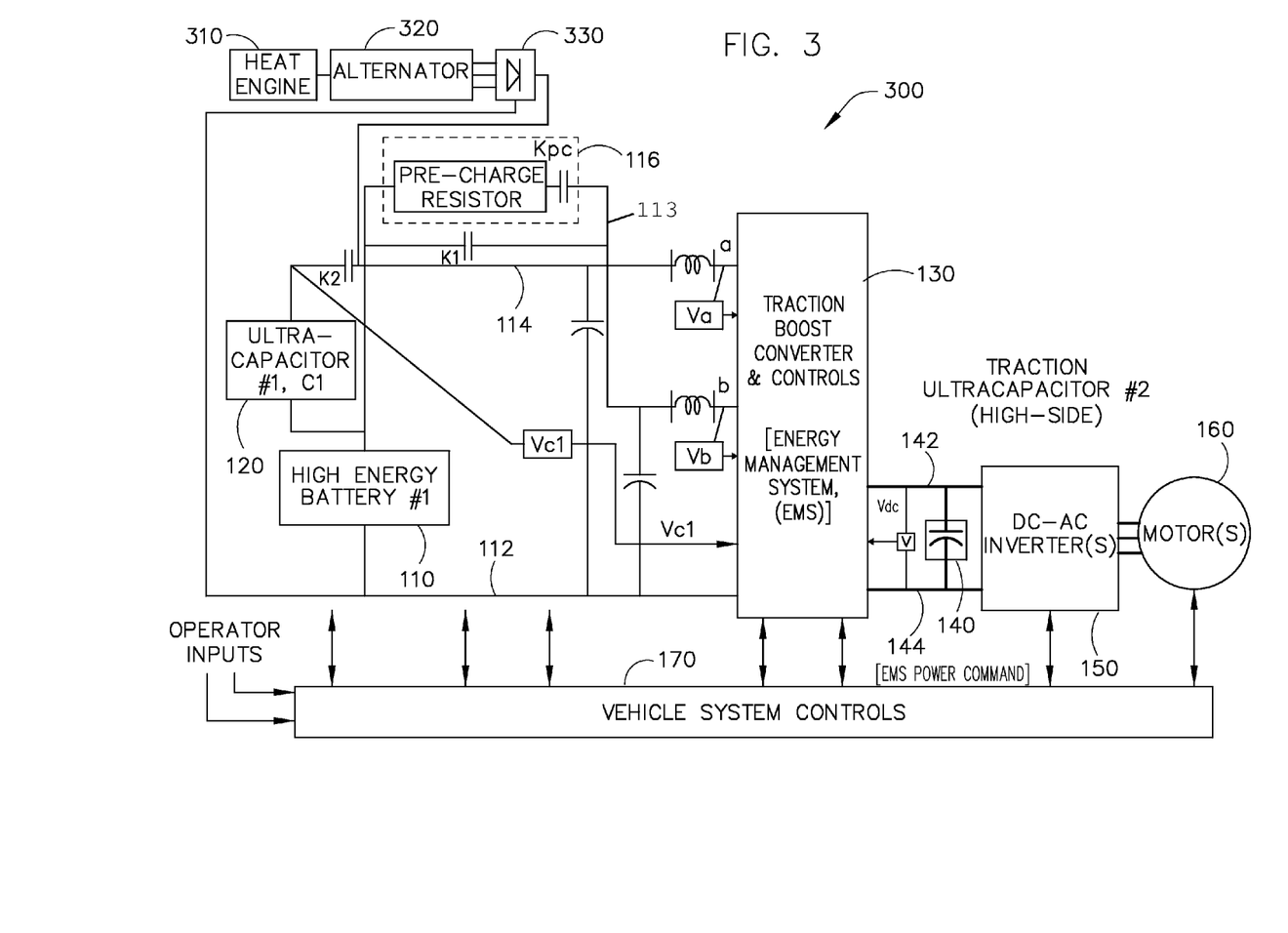
FIG. 3 schematically illustrates another embodiment of the exemplary propulsion system.

FIG. 3 illustrates an additional embodiment of the invention. System 300 illustrated in FIG. 3 is substantially similar to system 100 shown in FIG. 1, and thus numbers used to indicate components in FIG. 1 will also be used to indicate similar components in FIG. 3. As shown, system 300 includes the components of system 100, with an auxiliary power unit added on the low voltage side of multi-channel bi-directional boost converter 130. The auxiliary power unit comprises a heat engine 310, alternator 320, and rectifier 330. The output of rectifier 330 is coupled to busses 112 and 114 such that energy produced by heat engine 310 and alternator 320 supplements, when necessary, the energy provided by ultracapacitor 120 and/or energy battery 110. The hybrid electric configuration shown in system 300 allows for sufficient energy to be provided to AC motor 160 even in instances where the charge power level of ultracapacitor 120 and energy battery 110 are substantially depleted. Further, the auxiliary power unit is also capable of providing energy to charge ultracapacitor 120 and/or energy battery 110, depending upon the state-of-charge of these energy storage devices.

Figure 4:
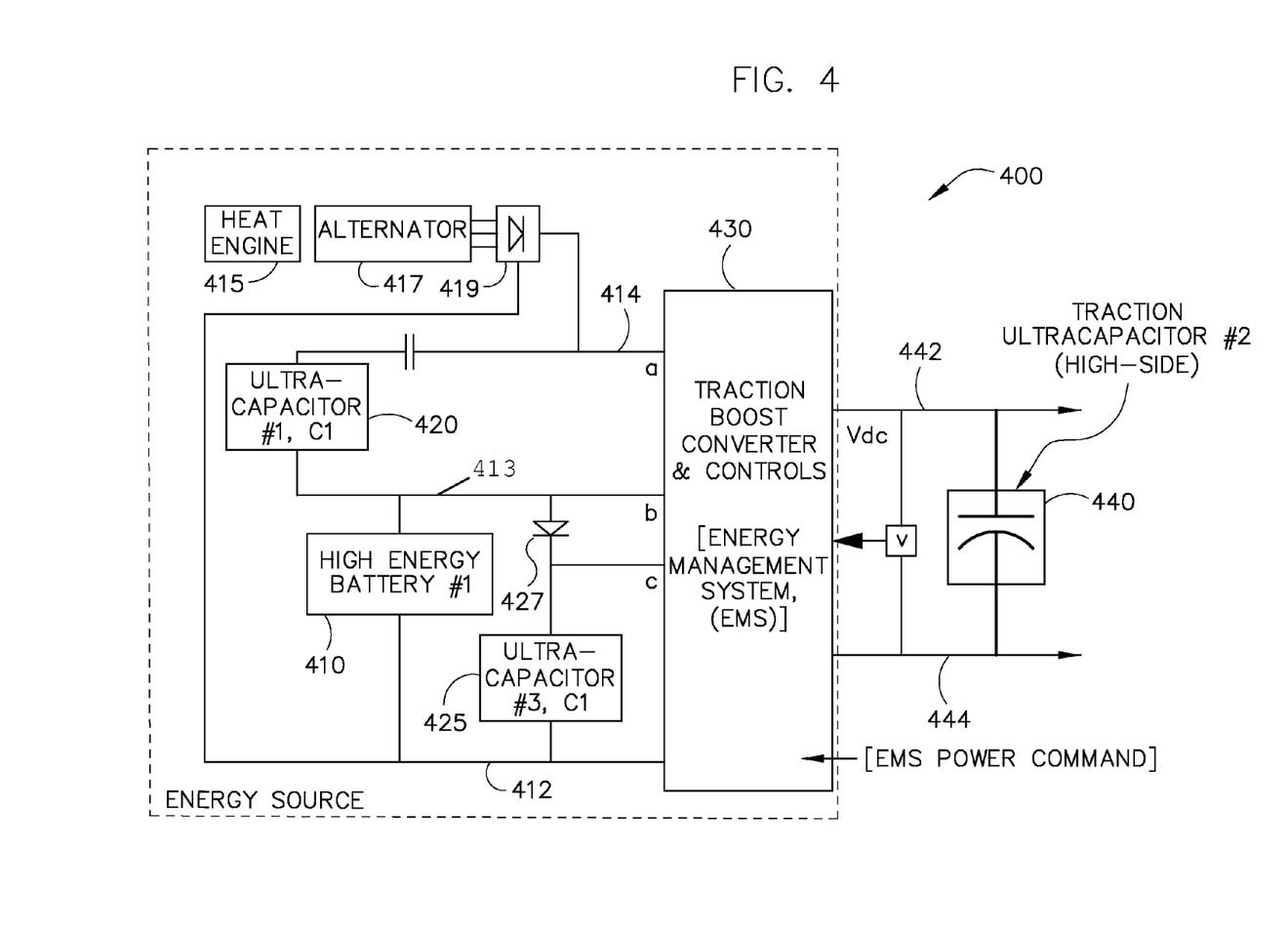
FIG. 4 schematically illustrates another embodiment of the exemplary propulsion system.

Another embodiment of the invention is shown in FIG. 4. Similar to systems 100 and 300 respectively illustrated in FIGS. 1 and 3, system 400 provides an ultracapacitor 420 coupled in series with energy battery 410, wherein both ultracapacitor 420 and energy battery 410 are electrically coupled, via busses 412, 413, and 414, to a multi-channel bi-directional boost converter 430. On the high voltage side of multi-channel bi-directional boost converter 430, another ultracapacitor 440 is coupled in parallel with the multi-channel bi-directional boost converter 430 and a motor (not shown) via DC Link 442 and DC Link 444. Additionally, an auxiliary power source is coupled to busses 414 and 412 on the low voltage side of multi-channel bi-directional boost converter 430. As with system 300, the auxiliary power source comprises a heat engine 415, alternator 417, and rectifier 419. The output of rectifier 419 is coupled to busses 412 and 414 such that energy produced by heat engine 415 and alternator 417 supplements, when necessary, the energy provided by ultracapacitor 420 and/or energy battery 410. System 400 also comprises an additional ultracapacitor 425. Ultracapacitor 425 acts to provide yet another energy source in the event that the energy demand to power the motor exceeds that which the ultracapacitor 420, energy battery 410, and the auxiliary power source can provide. Ultracapacitor 425 is also operable to accept energy during regenerative braking events, adding to the overall efficiency to system 400. Further, if the operator continues to demand additional power to operate the vehicle, for example while climbing a long uphill grade, thereby depleting the State of Charge (SOC) of ultracapacitor 425 to some predetermined minimum value such that the voltage of ultracapacitor 425 is below the voltage of energy battery 410, a unidirectional conducting apparatus 427, such as a diode for example, conducts such that the bi-directional boost converter 430 extracts power and energy primarily from energy battery 410 using two channels of the multi-channel bi-directional boost converter 430, thereby allowing approximately twice the rated power compared to a single channel of the bi-directional boost converter 430. Such a configuration acts to facilitate increasing the operation speed of the vehicle, especially when ultracapacitor's stored energy is depleted or near a predetermined voltage limit.

Figure 5:
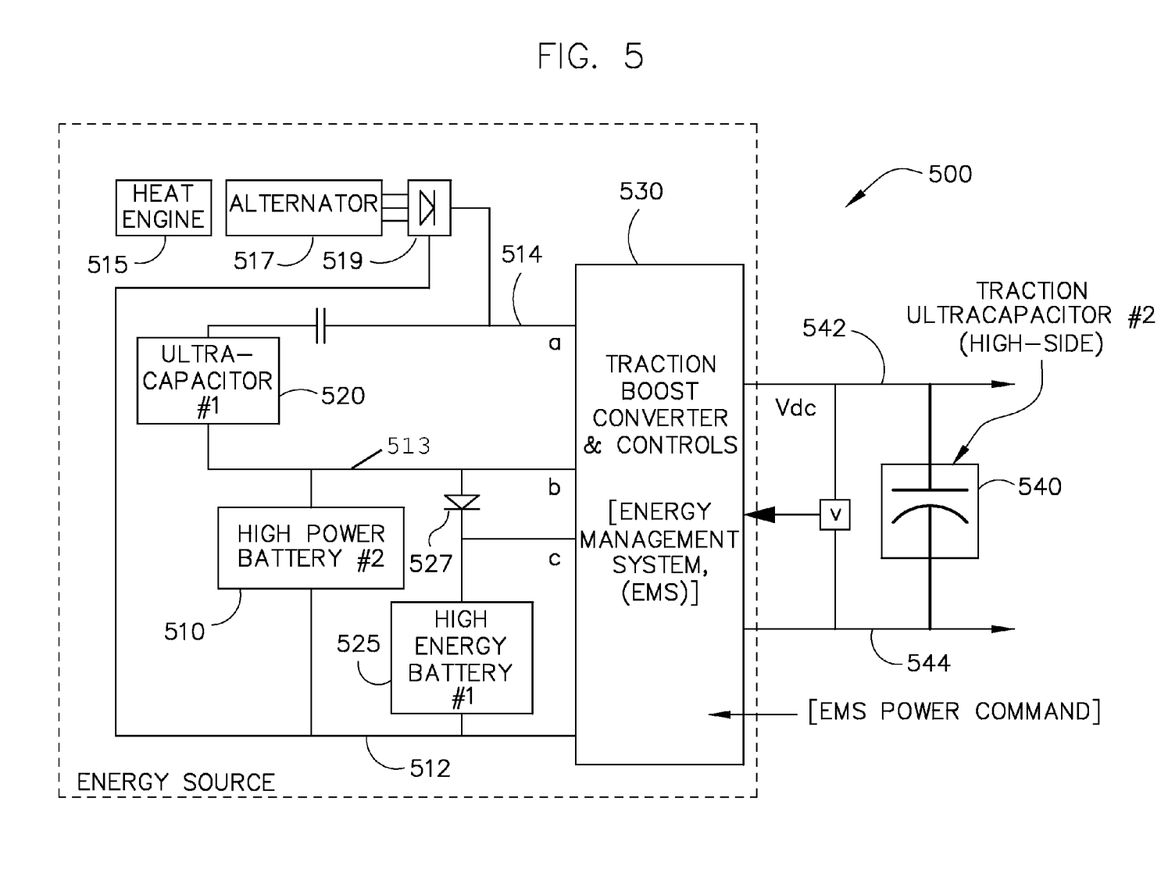
FIG. 5 schematically illustrates another embodiment of the exemplary propulsion system.

FIG. 5 illustrates yet another embodiment of the invention. Unlike system 400 shown in FIG. 4, system 500 provides an ultracapacitor 520 coupled in series with a power battery 510. The term power battery as used herein describes a battery having a high power density (e.g., on the order of 300 W/kg or greater, such as a nickel cadmium battery, nickel-metal hydride battery, or Li-ion battery), yet a relatively low energy density. Power batteries, however, are more readily electrically rechargeable than energy batteries, and thus power batteries have a greater capability for recapturing energy generated during high power regenerative braking events. Both ultracapacitor 520 and power battery 510 are electrically coupled, via busses 514, 513, and 512, to a multi-channel bi-directional boost converter 530. On the high voltage side of multi-channel bi-directional boost converter 530, another ultracapacitor 540 is coupled in parallel with the multi-channel bi-directional boost converter 530 and a motor (not shown) via DC Link 542 and DC Link 544. As with system 400, system 500 also comprises an auxiliary power source coupled to busses 514 and 512 on the low voltage side of multi-channel bi-directional boost converter 530. As with systems 300 and 400, the auxiliary power source comprises a heat engine 515, alternator 517, and rectifier 519. The output of rectifier 519 is coupled to busses 512 and 514 such that energy produced by heat engine 515 and alternator 517 supplements, when necessary, the energy provided by ultracapacitor 520 and/or power battery 510. System 500 also comprises an energy battery 525. Energy battery 525, like ultracapacitor 425 shown in FIG. 4, acts to provide yet another energy source in the event that the energy demand to power the motor exceeds that which the ultracapacitor 520, energy battery 510, and the auxiliary power source can provide. Energy battery 525 is also operable to accept energy during regenerative braking events, adding to the overall efficiency to system 400. Further, if the operator continues to demand additional power to operate the vehicle, for example while climbing a long uphill grade, thereby depleting the State of Charge (SOC) of energy battery 525 to some predetermined minimum value such that the voltage of energy battery 525 is below the voltage of power battery 510, unidirectional conducting apparatus 527, such as a diode, conducts such that the bi-directional boost converter 530 extracts power and energy primarily from power battery 510 and lower power level from the energy battery 525 using two channels of the multi-channel bi-directional boost converter 530, thereby allowing approximately twice the rated power compared to a single channel of the multi-channel bi-directional boost converter 530. The lower power level extracted by energy battery 525 is due to inherently increased internal resistance of the energy battery 525 compared to the power battery 510.

Figure 6:
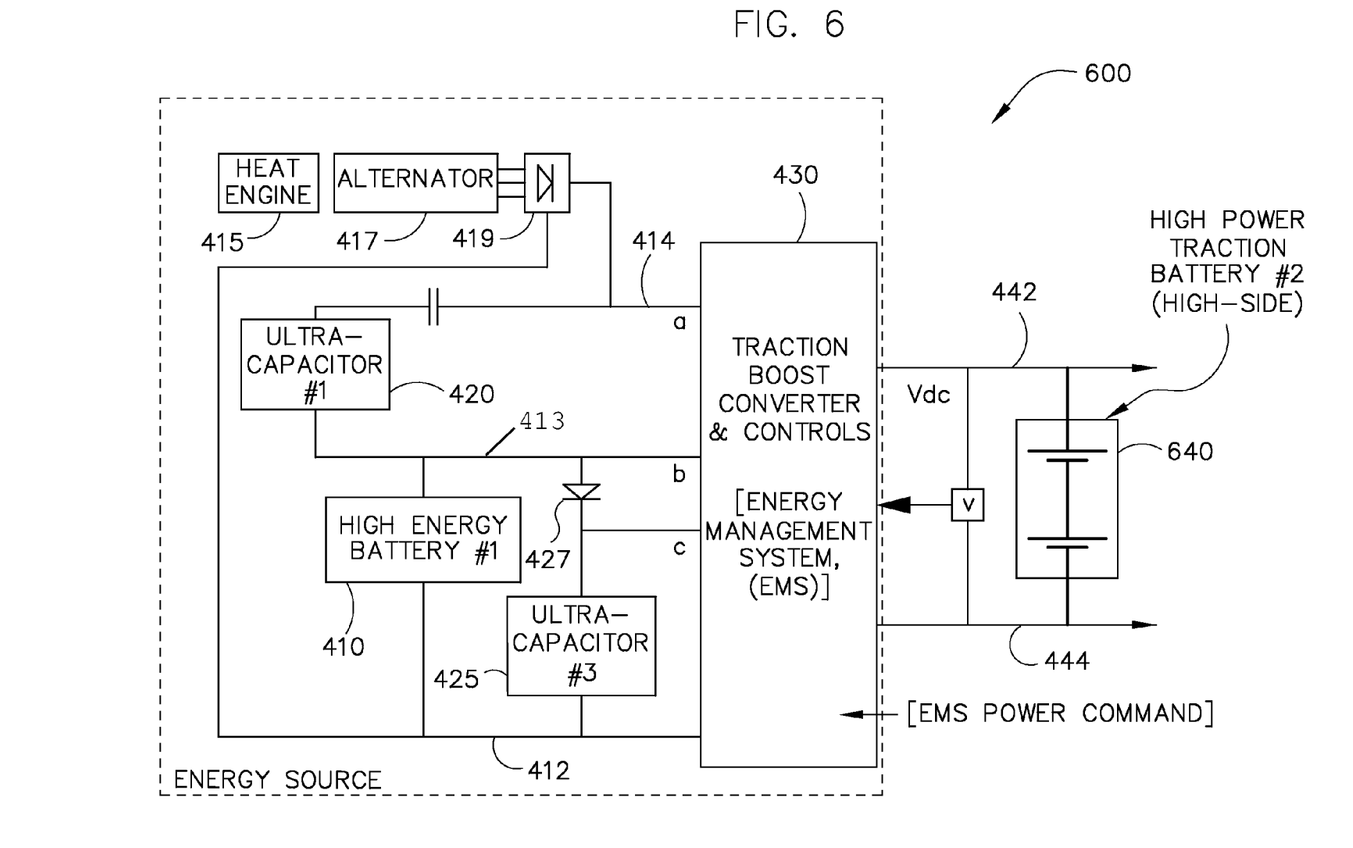
FIG. 6 schematically illustrates another embodiment of the exemplary propulsion system.

Referring now to FIG. 6, another embodiment of the invention is shown. System 600 illustrated in FIG. 6 is substantially similar to system 400 shown in FIG. 4, and thus numbers used to indicate components in FIG. 4 will also be used to indicate similar components in FIG. 6. Specifically, system 600 provides an identical configuration on the low voltage side of multi-channel bi-directional boost converter 430 as that illustrated in system 400. System 600, however, comprises power battery 640 on the high voltage side of the multi-channel bi-directional boost converter 430. As is shown in FIG. 6, power battery 640 is coupled in parallel with multi-channel bi-directional boost converter 430 and a motor (not shown) via DC Link 442 and DC Link 444. As discussed above with respect to system 500, a power battery is a battery having a relatively high power density (e.g., on the order of 300 W/kg, or greater), yet a relatively low energy density. Power batteries, again, are known to be more readily electrically rechargeable at higher rates than energy batteries, a benefit seen mostly during regenerative braking events. Power battery 640 is placed on the high voltage side of multi-channel bi-directional boost converter 430 such that a power density sufficient to provide vehicle acceleration may be supplied to the motor without an immediate need for substantial energy supplementation from the energy storage devices on the low voltage side of multi-channel bi-directional boost converter 430. Again, while the power battery 640 is capable of providing a sufficient amount of energy to accelerate the vehicle, power batteries have limited energy densities, meaning that the stateof-charge (SOC) of the power battery is quickly depleted during accelerating events. However, as a supplemental power supply for both supplying energy and recapturing energy during regenerative braking events, power battery 640 effectively improves the overall efficiency of system 600, especially for vehicle applications and dynamic loads that require high pulsed power or electric drives that require high output torque at relatively high motor speed at high repetition frequency, i.e., drives for people mover type applications where the acceleration and regenerative braking events occur at relatively high motor speeds.

Figure 7:
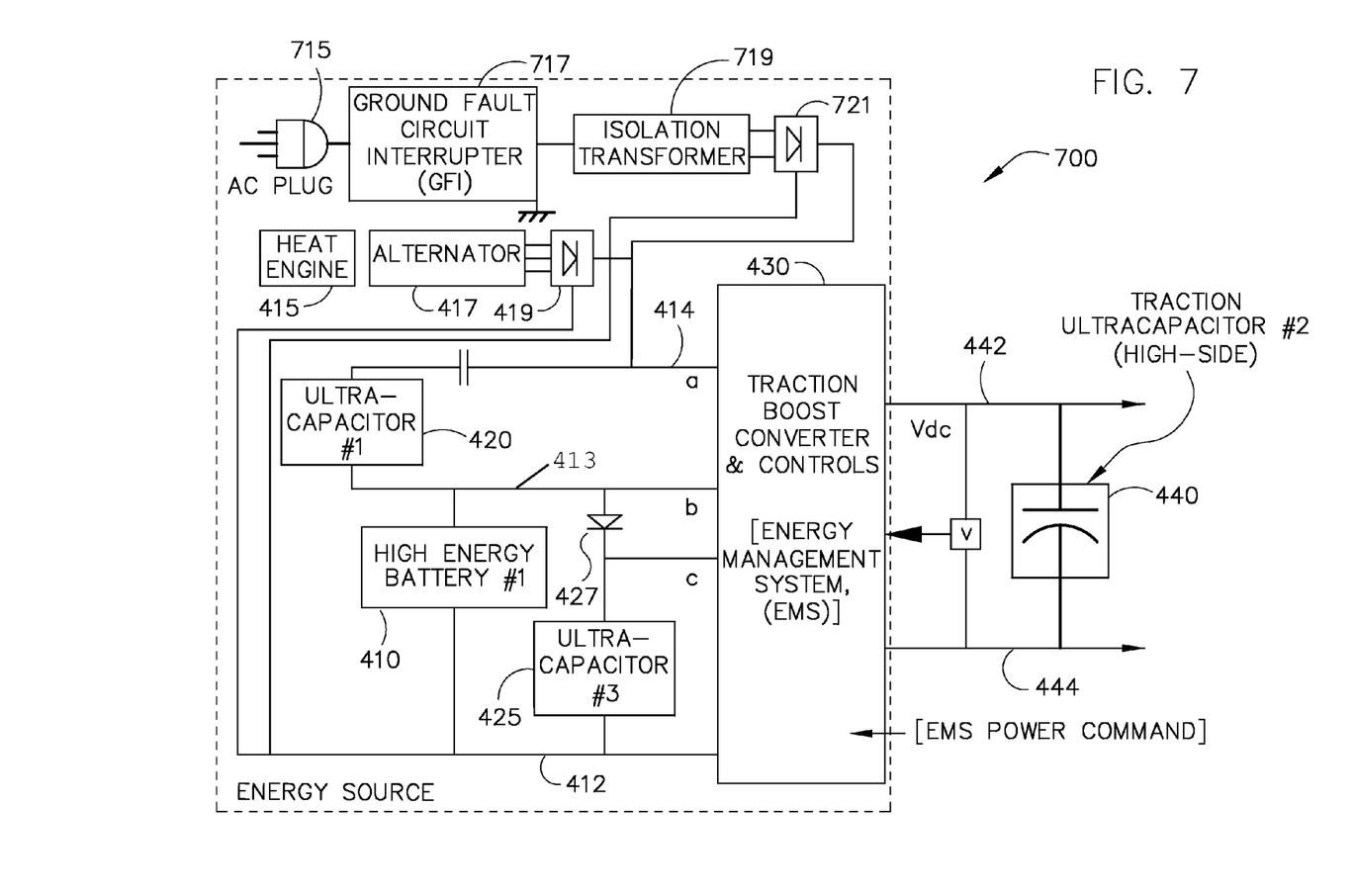
FIG. 7 schematically illustrates another embodiment of the exemplary propulsion system.

FIG. 7 schematically illustrates yet another embodiment of the invention. The embodiment of FIG. 7 is substantially the same as that shown in FIG. 4, with the exception of the auxiliary power unit. That is, the auxiliary power unit of system 700 includes not only a heat engine 415, alternator 417, and rectifier 419, but also a plug-in electrical system comprising AC plug 715, Ground Fault Current Interrupter (GFI) 717, Isolation Transformer 719, and rectifier 721. When the vehicle powered by system 700 is not under operation, AC plug 715 can be coupled to an external electrical power source (i.e., utility grid) to supply energy through rectifier 721 to the energy storage devices on the low voltage side of bi-directional boost converter 430. Again, these energy storage devices include ultracapacitor 420, ultracapacitor 425, and energy battery 410 on the low voltage side of multi-channel bi-directional boost converter 430, plus ultracapacitor 440 on high voltage side of bi-directional boost converter 430. Accordingly, system 700 shown in FIG. 7 is not only capable of energy regeneration via heat engine 415 while under operation, but can also be recharged when the vehicle is not in use. Alternatively, the auxiliary power unit system shown in FIG. 7 can also be configured without the use of heat engine 415, alternator 417, or rectifier 419. As such, an auxiliary power unit comprising only the plug-in electrical system may provide a low-cost solution to energy regeneration in the energy storage devices on the low voltage side of bi-directional boost converter 430.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A propulsion system comprising:
   an electric drive;
   a first energy storage system electrically coupled to the electric drive through a direct current (DC) link;
   a second energy storage system electrically coupled to the electric drive; and
   a multi-channel bi-directional boost converter coupled to the first energy storage system and to the second energy storage system such that the second energy storage system is decouplable from the DC link; wherein the second energy storage system comprises at least one power battery coupled in series with at least one ultracapacitor, the second energy storage system further comprises at least one energy battery and a unidirectional conducting apparatus configured so the multi-channel bi-directional boost converter extracts power and energy from the at least one power battery and a lower power level from the at least one energy battery using two channels.

2. The propulsion system of claim 1, wherein the electric drive is one of an alternating current (AC) traction drive or a direct current (DC) traction drive.

3. The propulsion system of claim 1, wherein the first energy storage system comprises at least one of a power battery and an ultracapacitor, and the first energy storage system is coupled to the multi-channel bi-directional boost converter through the DC link.

4. The propulsion system of claim 3, wherein the first energy storage system comprises the power battery and is configured to provide a regenerative energy to the at least one ultracapacitor of the second energy storage system.

5. The propulsion system of claim 1, wherein the at least one ultracapacitor of the second energy storage system is configured to capture energy during regenerative braking events associated with vehicle deceleration.

6. The propulsion system of claim 5, wherein the multi-channel bi-directional boost converter is configured to control an amount of energy transferred to the at least one ultracapacitor of the second energy storage system during the regenerative braking events as a function of at least one of vehicle speed, state-of-charge of the at least one ultracapacitor, state-of-charge of the battery, electric drive torque demand and electric drive speed.

7. The propulsion system of claim 1, wherein the second energy storage system further comprises a pre-charge circuit configured to at least partially charge the at least one ultracapacitor.

8. The propulsion system of claim 1, further comprising an auxiliary power unit coupled to the second energy storage system.

9. The propulsion system of claim 8, wherein the auxiliary power unit is a heat engine.

10. The propulsion system of claim 8, wherein the auxiliary power unit comprises both a heat engine and a plug-in electrical interface.

11. The propulsion system of claim 8, wherein the auxiliary power unit comprises a plug-in electrical interface.

12. A method of assembling a control system comprising:
    coupling a first energy storage system to an electric drive through a direct current (DC) link;
    connecting an ultracapacitor in series with a power battery, and at least one energy battery and a unidirectional conducting apparatus to form a second energy storage system; and
    coupling a multi-channel bi-directional boost converter to each of the first energy storage system and second energy storage system such that the first energy storage system is decoupled from the second energy storage system, and wherein the multi-channel bi-directional boost converter is further coupled to the electric drive through the DC link, further wherein the multi-channel bi-directional boost converter extracts power and energy from the power battery and a lower power level from the at least one energy battery using two channels.

13. The method of claim 12, comprising coupling a pre-charge circuit to the ultracapacitor to at least partially recharge the ultracapacitor.

14. The method of claim 12, comprising coupling another ultracapacitor to the second energy storage system.

15. The method of claim 12, comprising dynamically controlling an input and an output voltage of the ultracapacitor coupled in series with the power battery through the multi-channel bi-directional boost converter, and controlling an amount of energy transferred to the ultracapacitor coupled in series with the power battery during a regenerative breaking event, wherein the amount of energy transferred is a function of at least one of vehicle speed, state-of-charge of the ultracapacitor, state-of-charge of the battery, electric drive torque demand and electric drive speed.

16. An energy storage arrangement for an electrically powered system, the arrangement comprising:
- at least one ultracapacitor coupled in series with at least one power battery;
- at least one energy battery and a unidirectional conducting apparatus; and
- a multi-channel bi-directional boost converter coupled to the at least one ultracapacitor and the at least one power battery, wherein the multi-channel bi-directional boost converter is configured to dynamically control an input and an output voltage from the at least one ultracapacitor and the at least one power battery, further wherein the at least one energy battery and the unidirectional conducting apparatus configured so the multi-channel bi-directional boost converter extracts power and energy from the at least one power battery and a lower power level from the at least one energy battery using two channels.

17. The energy storage arrangement of claim 16, wherein the multi-channel bi-directional boost converter is further coupled to an alternating current (AC) traction drive through a direct current (DC) link.

18. The energy storage arrangement of claim 16, wherein the multi-channel bi-directional boost converter is configured to control an amount of energy captured by the at least one ultracapacitor during a regenerative braking event.

19. The energy storage arrangement of claim 16, wherein stored energy from both the at least one ultracapacitor and the at least one power battery is provided through the multi-channel bi-directional boost converter during high speed and high power acceleration of a vehicle powered by the electrically powered system.

20. The energy storage arrangement of claim 16, further comprising a heat engine coupled to the at least one ultracapacitor and the at least one power battery to supply auxiliary power thereto.

21. The energy storage arrangement of claim 16, further comprising a heat engine and a plug-in electrical interface both coupled to the at least one ultracapacitor and the at least one power battery to provide auxiliary power thereto.

* * * * *